H. N. DAY.
COMBINED JACK TRUCK AND STAND.
APPLICATION FILED JUNE 1, 1909.
948,299.
Patented Feb. 1, 1910.
2 SHEETS—SHEET 1.
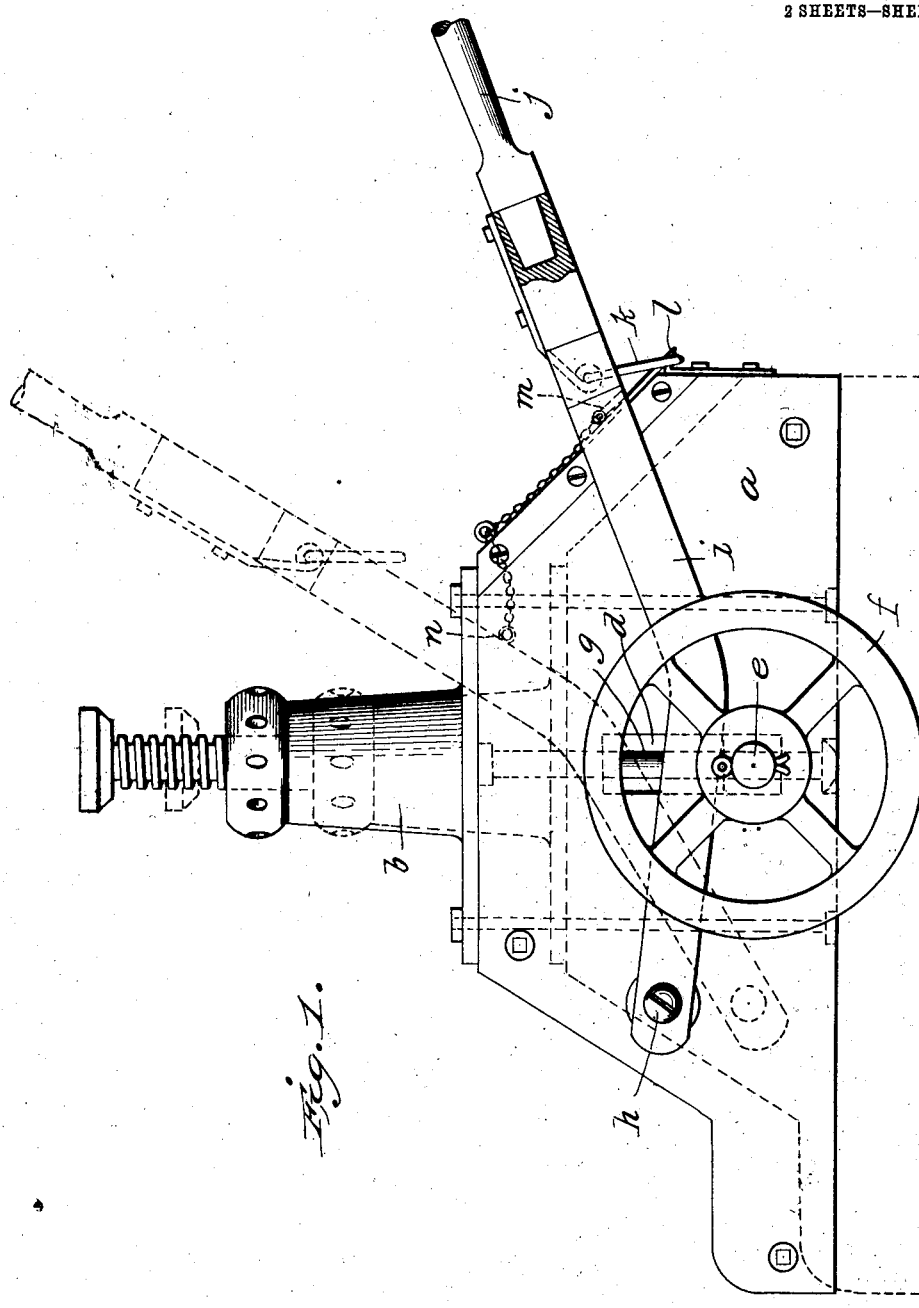
Witnesses:
Inventor:
H. N. Day
By Davis & Davis
Attorneys

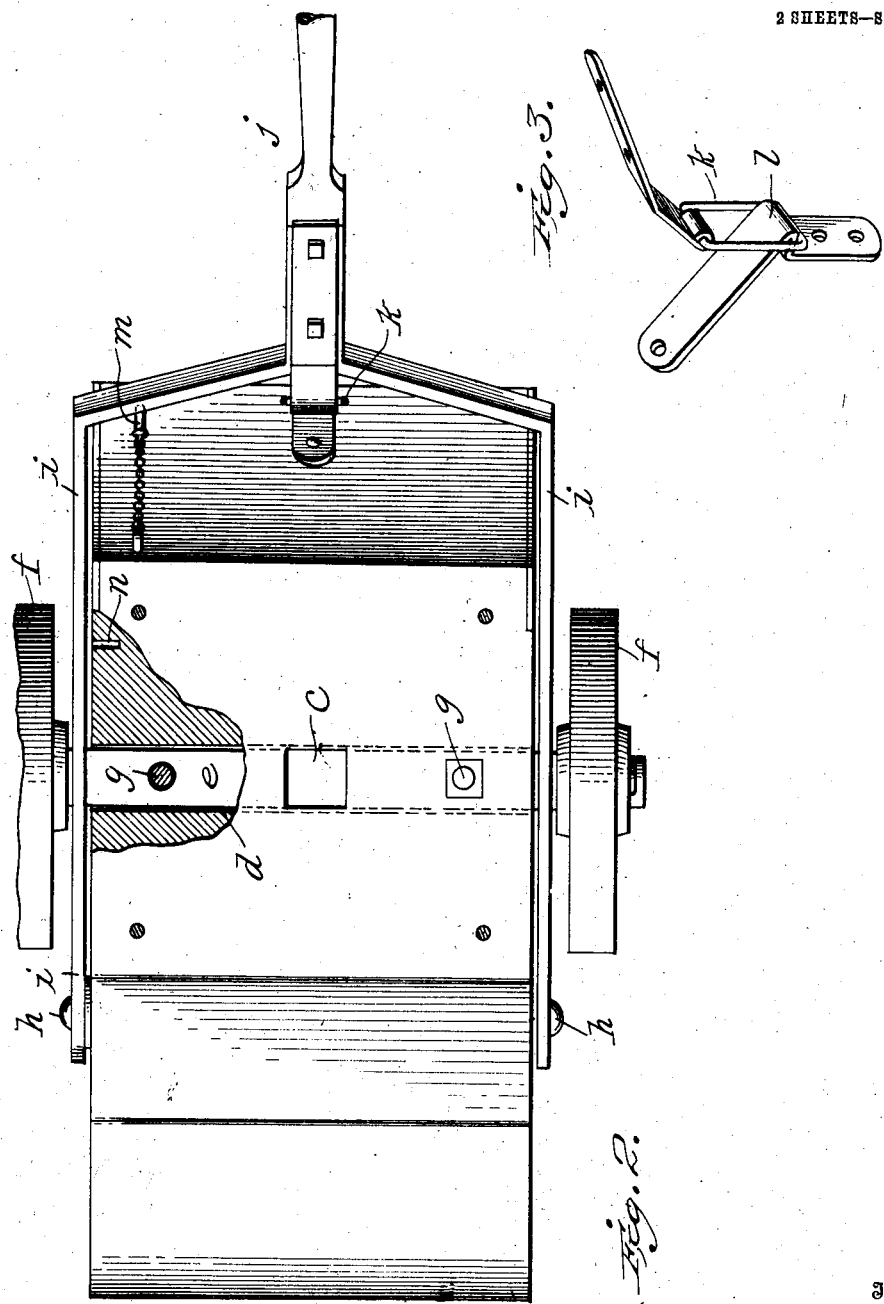

UNITED STATES PATENT OFFICE.

HARRY N. DAY, OF ROANOKE, VIRGINIA, ASSIGNOR OF ONE-HALF TO ROSCOE J. WRIGHT, OF ROANOKE, VIRGINIA.

COMBINED JACK TRUCK AND STAND.

948,299.

Specification of Letters Patent.    Patented Feb. 1, 1910.

Application filed June 1, 1909. Serial No. 499,292.

*To all whom it may concern:*

Be it known that I, HARRY N. DAY, a citizen of the United States of America, and a resident of Roanoke, county of Roanoke, State of Virginia, have invented certain new and useful Improvements in Combined Jack Trucks and Stands, of which the following is a clear and full specification, reference being had to the accompanying drawings, in which—

Figure 1 is a side elevation with the base block elevated; Fig. 2 a plan view partly broken away; and, Fig. 3 a detail perspective view of the latching devices.

The object of this invention is to provide a combined truck and stand for heavy lifting jacks, such as are used in railroad shops, repair yards etc., for lifting cars, locomotives, etc.; and the invention consists of certain novel features of construction hereinafter described and particularly pointed out in the claims appended.

The letter $a$ designates the base which may be made of wood or metal and may be of any convenient size and shape to accommodate jacks of various makes and capacity. Bolted to the upper flat face of the base is a jack $b$ of any suitable make, the base being provided with a central hole $c$ to permit the lifting bar to descend into the base. A transverse vertical slot $d$ extends entirely through the base at a point between its upper and lower faces, and through this slot extends an axle $e$ on the outer projecting ends of which are mounted transporting wheels $f$.

The axle has free vertical play in the slot and it is guided in its vertical movements by a pair of vertical rods $g$ mounted in the base and passing through the slot. By means of bolts $h$ the ends of a pair of bars $i$ are pivotally attached to the opposite sides of the base, and these arms extend rearwardly over the projecting ends of the axle and are bent toward each other at their rear extremities and are attached together and to a suitable tongue or handle $j$. Pivotally depending from the rear extremities of the connected arms $i$ is a link $k$ which when the arms are thrown down to the position shown in Fig. 1 is adapted to automatically engage under a rearwardly extending hook $l$ bolted to the rear end of the base.

When the base is to be lifted off the ground for the purpose of transportation, the handle or lever $j$ is swung downwardly, which act brings into action the lever function of the side bars $i$ and raises the base from the floor, the projecting ends of the axle serving as fulcra for the levers. The base is lifted until the bottom of the slot $d$ strikes against the axle, at which point the link $k$ will slip under the hook $l$ and thus lock the parts in that position and enable the apparatus to be readily wheeled about. When the apparatus is properly positioned under the car the latch hook $k$ is disconnected and the base is permitted to fall by gravity to the floor. If a screw jack be mounted on the base I prefer attaching the handle or tongue $j$ to the lever frame by means of a tenon and socket, as shown in Fig. 1 so that this handle may be removed and thus be out of the way. I may employ a pin $m$ chained to the base, to prop up the lever frame when for any reason it is desired to have it stand in a more upright position out of the way. A hole $n$ is made in the side of the base at the proper point to receive said pin $m$.

By the use of my apparatus it will be observed that the base of the jack is greatly enlarged, therefore reducing to a minimum the possibility of cars being tipped over and injuring the cars and the workmen, and it will be observed also that there is a large saving of time in moving the jacks from place to place. Also that the jack is ready to be operated as soon as it is placed under the car to be raised, the building of foundations with loose blocks, wedges etc. being avoided. It will be further noted that by providing the base with the hole $c$ to permit the lower end of the stem or lifting bar to pass down into the base, the lifting stems or bars may be made longer than usual thereby increasing the lifting height six or eight inches. It will be further noted that my apparatus is simple and inexpensive in construction and possesses the highest degree of durability and practicability, it being especially highly useful where heavy jacks are in use.

The further advantage is that the life of the jack is greatly increased by the use of my truck. Jacks are seldom damaged with their load as they are seldom taxed beyond their capacity. Most damage occurs from careless handling by workmen, such as being thrown off loose block foundations or unlevel foundations, thus causing the jack to upset or tilt. By the use of this combined truck and base these dangers are avoided and the life of the jack is prolonged.

Having thus described my invention, what I claim as new, and desire to secure by Letters Patent, is:

1. In combination a base or stand having mounted on it a lifting jack and provided with a transverse vertical slot, an axle extending through said slot and having vertical play therein and carrying transporting wheels at its ends, a unitary lever frame embodying two side bars pivoted to the base in front of the axle and extending backwardly over the projecting ends thereof, and means for connecting together the two side bars at their rear ends and means for locking said lever frame down to the base when it is depressed to raise the base.

2. In combination, an axle carrying a pair of wheels, a base extending between the wheels and forwardly and backwardly thereof, said base being provided with a vertical transverse slot extending entirely through it from side to side, said axle being freely vertically movable in said slot, means for vertically guiding the axle in the slot, a jack mounted centrally of the base, a handle connected to the base and extended rearwardly therefrom, said handle embodying two side bars lying above and adapted to press on the axle when the handle is forced downwardly at its rear end to raise the base off the floor, and means for locking the handle and its side bars in their down position to the base, whereby the base will be blocked in its position above the floor and be supported entirely on wheels.

In testimony whereof I hereunto affix my signature in the presence of two witnesses this 22nd day of May 1909.

HARRY N. DAY.

Witnesses:
SAMUEL M. CHILTON,
CHARLES C. GROVE.